(12) United States Patent
Maillard et al.

(10) Patent No.: US 9,164,272 B2
(45) Date of Patent: Oct. 20, 2015

(54) ELECTROWETTING OPTICAL DEVICE

(75) Inventors: Mathieu Maillard, Lyons (FR);
Geraldine Malet, Villeurbanne (FR);
Matthias Stefan Ober, Midland, MI
(US); Daniel L. Dermody, Midland, MI
(US)

(73) Assignee: PARROT, Paris (FR)

( * ) Notice: Subject to any disclaimer, the term of this patent is extended or adjusted under 35 U.S.C. 154(b) by 161 days.

(21) Appl. No.: 13/822,373

(22) PCT Filed: Sep. 13, 2011

(86) PCT No.: PCT/EP2011/065871
§ 371 (c)(1),
(2), (4) Date: Jul. 23, 2013

(87) PCT Pub. No.: WO2012/035026
PCT Pub. Date: Mar. 22, 2012

(65) Prior Publication Data
US 2013/0301109 A1 Nov. 14, 2013

Related U.S. Application Data

(60) Provisional application No. 61/382,227, filed on Sep. 13, 2010.

(51) Int. Cl.
*G02B 26/00* (2006.01)
*G02B 26/08* (2006.01)
*G02F 1/29* (2006.01)
*G02B 3/14* (2006.01)

(52) U.S. Cl.
CPC .............. *G02B 26/005* (2013.01); *G02B 3/14* (2013.01)

(58) Field of Classification Search
USPC .......................... 359/237, 290–292, 295, 298
See application file for complete search history.

(56) References Cited

U.S. PATENT DOCUMENTS

| 7,242,528 | B2 | 7/2007 | Renders et al. | |
| 7,570,434 | B2 * | 8/2009 | Kuiper et al. | 359/666 |
| 2002/0136948 | A1 * | 9/2002 | Missling et al. | 429/212 |
| 2006/0209422 | A1 * | 9/2006 | Renders et al. | 359/665 |
| 2007/0091455 | A1 | 4/2007 | Bae et al. | |

(Continued)

FOREIGN PATENT DOCUMENTS

| EP | 1 166 157 B1 | 7/2003 |
| EP | 1 701 196 A1 | 9/2006 |
| EP | 1 816 491 A1 | 8/2007 |

(Continued)

OTHER PUBLICATIONS

International Search Report issued in PCT/EP2011/065871 mailed Dec. 16, 2011 (3 pages).

(Continued)

*Primary Examiner* — Joseph P Martinez
*Assistant Examiner* — Brandi Thomas
(74) *Attorney, Agent, or Firm* — Osha Liang LLP

(57) ABSTRACT

An electrowetting optical device is provided comprising a conductive liquid and a non-conductive liquid, the liquids being non miscible, having different refractive indices and forming an interface, wherein the conductive liquid comprises from 5% by weight of a fluorinated salt, based the total weight of the conductive liquid. An apparatus comprising said electrowetting optical device is described as well.

12 Claims, 3 Drawing Sheets

(56) References Cited

U.S. PATENT DOCUMENTS

2007/0179201 A1 8/2007 Maillard et al.
2007/0217023 A1 9/2007 Kim et al.

FOREIGN PATENT DOCUMENTS

| EP | 2 009 468 A1 | 12/2008 |
| WO | 2006/013541 A1 | 2/2006 |
| WO | 2007/088453 A1 | 8/2007 |
| WO | 2010/015691 A1 | 2/2010 |

OTHER PUBLICATIONS

Written Opinion issued in PCT/EP2011/065871 mailed Dec. 16, 2011 (4 pages).

* cited by examiner

ELECTROWETTING OPTICAL DEVICE

FIELD OF THE INVENTION

The disclosure relates to an electrowetting optical device comprising a multi-phase liquid composition. In particular, the disclosure relates to an electrowetting optical device comprising a conductive liquid and a non-conductive liquid, said liquids being non-miscible having different refractive indices and forming an interface. Preferably, the difference in the refractive index of said liquids is greater than 0.24, preferably over a broad temperature range, preferably from −30° C. to 85° C. Unless otherwise indicated, the expressions "high difference of refractive indices" and "broad temperature range" are intended within this meaning throughout the present description and the following claims.

In the present description and in the following claims, conductivity refers to electrical conductivity.

BACKGROUND ART

Optical lens driven by electrowetting and of variable focal length are described in European Patent EP-B1-1,166,157, the content of which is hereby incorporated by reference. A cell is defined by two transparent insulating plates and side walls. The lower plate, which is non-planar, comprises a conical or cylindrical depression or recess, which contains a drop of a non-conductive or insulating liquid. The remainder of the cell is filled with an electrically conductive liquid, non-miscible with the insulating liquid, having a different refractive index and substantially the same density. An annular electrode, which is open facing the recess, is positioned on the rear face of the lower plate. Another electrode is in contact with the conductive liquid. Through electrowetting phenomena it is possible to modify the curvature of the interface between the two liquids, according to the voltage V applied between the electrodes. Thus, a beam of light passing through the cell normal to the plates in the region of the drop will be focused to a greater or lesser extent according to the voltage applied. The conductive liquid generally is an aqueous liquid containing salts. The non-conductive liquid is typically an oil, an alkane or a mixture of alkanes, possibly halogenated.

In order to achieve a very performing optical lens, i.e. an optical lens being reliable and having a good optical quality measured as a low wave front error, a low response time and similar performances over a broad temperature range, the conductive liquid and the non-conductive liquid should meet a lot of specific requirements such as for example being immiscible, having substantially the same density, remain liquid in a broad temperature range, being chemically stable when in contact with each others, being as compatible as possible with the insulating plates and side walls encasing said electrowetting device, and having a predetermined refractive index difference.

The number of chemical compounds or mixture of compounds that can be used in the liquids and reaching all the above cited requirements is very limited.

It is known in the art that salts can be used as anti-freezing agents in the conductive liquid of optical electrowetting devices so that they can be operational and stored under 0° C. temperatures. Traditionally such devices, especially liquid lenses, have to be operational down to −10° C. and can be stored at temperature below −20° C. U.S. Pat. No. 7,242,528 discloses for example salts such as LiCl used in the conductive liquid of an electrowetting module to decrease the freezing point to below −20° C. US 20070179201 in the name of the Applicant describes the use of bromine anion and other freezing-point lowering agents in conductive liquid. US 20070091455 discloses an electrowetting system wherein the conductive liquid contains a mixture of salts to decrease the freezing point while minimizing changes in some physical properties of the conductive liquid.

A drawback with known prior art is an excessive increase of the refractive index of the conductive liquid when comprising salts as anti-freezing agents. Since the conductive liquid has preferably a refractive index lower than the refractive index of the non-conductive liquid, the use of salts as freezing point lowering agents according to the prior art tends to decrease the difference in refractive index between the conductive and the non-conductive liquids, which is undesirable in many applications, such as for example in zoom applications.

In these applications it is desirable to provide optical electrowetting devices showing high refractive index difference between the two liquids forming the optical interface over a broad temperature range, while filling all the previous cited requirements to ensure a good performance of the optical electrowetting devices.

Another drawback with known prior art on optical electrowetting device such as optical lenses or zooms is the degradation of the optical performance of the device due to chromatic aberrations that can lead to blurred images. In particular, increasing the amount of salts can lead to an increase of the chromatic aberrations. Chromatic aberrations are due to the variation of the refractive index of a material forming an optical element according to the wavelengths of light, also known as the dispersion of the lens. In the case of a lens, chromatic aberrations are the failure of a lens to focus all colors to the same point. Chromatic aberrations can be a problem difficult to overcome in optical design, especially when using for example an optical electrowetting device wherein the optical power is changing according to the application of a voltage, thus providing variable chromatic aberrations. This problem can be even greater for zoom applications wherein a large optical power variation is required, for example a zoom where the zoom function is provided by an optical electrowetting device having a large optical power variation, for example a device with the two liquids forming the optical interface by having a high refractive index difference. It is thus also desirable to provide optical electrowetting devices showing low chromatic aberrations.

SUMMARY OF THE INVENTION

It is an objective of the present disclosure to at least partially overcome one or more of the drawbacks in the prior art.

A further objective of the disclosure is to provide an electrowetting optical device having a good optical quality, in particular limited chromatic aberrations.

A further objective of the present disclosure is to provide a very performing electrowetting optical device filling all the above cited requirements and wherein the conductive liquid has a low freezing point while showing a low refractive index, thus resulting in an electrowetting optical device showing a high refractive index difference over a broad temperature range.

Still another objective is to provide such a device that can be used as an optical zoom variable, a variable focus liquid lens, an optical image stabilization device, a light beam deflector, a variable illumination device and any other optical device using electrowetting in an inside or outside environment.

The Applicant has surprisingly found that a fluorinated salt at a concentration from 5% by weight in the conductive liquid of such an electrowetting optical device allows limiting chromatic aberrations.

Furthermore, the Applicant has surprisingly found that when the non-conductive liquid has the highest refractive index among the two liquids, the use of fluorinated salts within this concentration range lowers the freezing point of solution while limiting the increase of the refractive index of the conductive liquid. When the non-conductive liquid has the highest refractive index among the two liquids, this allows keeping a high difference in refractive index between the conductive and non-conductive liquids.

According to a one aspect thereof, the disclosure concerns an electrowetting optical device comprising a conductive liquid and a non-conductive liquid, said liquids being non-miscible and forming an interface, wherein the conductive liquid comprises from 5% by weight of a fluorinated salt, based the total weight of the conductive liquid.

Herein, the words "comprise/comprising" are synonymous with (means the same thing as) "include/including," "contain/containing", are inclusive or open-ended and do not exclude additional, unrecited elements. Limit values of ranges using for example the words "from" and "from . . . to" are considered included in the ranges.

The terms "non-miscible" and "immiscible" refer to liquids that are non-miscible or substantially non-miscible the one into the other. In the present description and in the following claims, two liquids are considered non-miscible when their partial miscibility is below 0.2%, preferably below 0.1%, more preferably below 0.05%, even more preferably below 0.02%, all values being measured within a given temperature range, for example at 20° C.

Preferably, the liquids have a low mutual miscibility over a broad temperature range. Preferably, the broad temperature range is from −30° C. to 85° C., more preferably from −20° C. to 65° C.

According to a preferred embodiment, the conductive liquid comprises water and at least 5% by weight, preferably more than 5% by weight, of a ionic fluorinated salt, based on the total weight of the conductive liquid, possibly mixed with one or more other salt, either organic or inorganic, preferably at least one organic or inorganic ionic or ionizable salt, conferring conductive properties to the liquid, preferably comprising water, and allowing to decrease the freezing point thereof. Preferred ionic salts are sodium sulfate, potassium acetate, sodium acetate, zinc bromide, sodium bromide, lithium bromide etc.

Preferably, water to be used in the conductive liquid is as pure as possible, i.e. free, or substantially free, of any other dissolved components that could alter the optical properties of the electrowetting optical device. Ultra pure water is most preferably used.

Fluorinated salts are ionic salts, preferably organic ionic salts, that include fluorine in their sum formulae. In the following specification and following claims, "ionic salts" refers to salts that are totally or substantially dissociated in water (such as an acetate-anion and a cation). "Ionizable salts" refers to salts that are totally or substantially dissociated in water, after chemical, physical or physico-chemical treatment. Examples of anions include, but are not limited to, halides, e.g. chloride, bromide, iodide, sulfate, carbonate, hydrogen carbonate, acetate, 2-fluoracetate, 2,2-difluoroacetate, 2,2,2-trifluoroacetate, 2,2,3,3,3-pentafluoropropanoate, trifluoromethanesulfonate—thereafter referred as triflate, hexafluorophosphate, fluoride, as well as mixtures thereof. Examples of cations include, but are not limited to, alkali, alkaline-earth and metallic cations e.g. sodium, magnesium, potassium, lithium, calcium, zinc, fluorinated ammonium, e.g. N-(fluoromethyl)-2-hydroxy-N,N-dimethyl-ethanaminium.

Organic and inorganic ionic and ionizable salts are thus well known in the art, and examples of these include, but are not limited to potassium acetate, magnesium chloride, zinc bromide, lithium bromide, lithium chloride, calcium chloride, sodium sulfate, sodium triflate, sodium acetate, sodium trifluoroacetate and the like, as well as mixtures thereof.

Fluorinated salts advantageously allow maintaining the refractive index of the conductive liquid low while allowing changes of the other properties of the conductive liquid, such as lowering of the freezing point of the conductive liquid.

Fluorinated salts, unlike other salts like chloride salts, have also the advantage to be not corrosive with the material constituting the cell of the electrowetting optical device, such for example steel, stainless steel or brass.

Advantageously, fluorinated salts have a limited impact on Abbe number, which can be used as a measure of chromatic aberration properties. Abbe number is defined as $V=(nD-1)/(nF-nC)$ with nD, nF and nC referring to the Fraunhofer D, F and C lines (589.2 nm, 486.1 nm and 656.3 nm respectively). Hence a low dispersion solution is characterized by a high Abbe number. The use of fluorinated salts at a concentration from 5% by weight in the conductive liquid of the electrowetting optical device allow maintaining a high Abbe number for the conductive liquid, for example an Abbe number from 50 to 62, and thus allow providing an electrowetting optical device having a conductive liquid with low chromatic aberrations, thus reducing the overall chromatic aberrations of the electrowetting optical device. Such an electrowetting optical device is particularly well suited to applications where chromatic aberrations are particularly undesirable, such as in zoom applications.

One further advantage of using fluorinated salts is that they allow maintaining a suitable density of the conductive liquid of the electrowetting optical device.

According to a further preferred embodiment, the salt present in the conductive liquid is sodium trifluoroacetate or sodium trifluoromethanesulfonate (also known as sodium triflate).

In one preferred embodiment, the non-conductive liquid comprises at least 6% of a fluorinated salt, preferably at least 8%, preferably at least 10%, preferably at least 15%, and even more preferably at least 20% by weight based the total weight of the conductive liquid.

According to one preferred embodiment, the concentration of the fluorinated salt is in the range from 5% to 60%, preferably in the range from 15% to 40%, preferably from 20% to 40%, preferably from 20% to 30% by weight based the total weight of the conductive liquid.

Use of salts at such preferred concentrations in the conductive liquid also allows maintaining a low miscibility between the two liquids. This advantageously results in low turbidity, low haze, and/or good transparency recovery for the electrowetting optical device, especially after thermal shocks.

The inventors have found that using a too high concentration of the fluorinated salt in the conductive liquid, for example above 60% by weight, may lead to an excessive difference of density between the conductive and the non-conductive liquid.

According to another preferred embodiment, the conductive liquid has a refractive index lower than the refractive index of the non-conductive liquid.

In a preferred embodiment, the conductive liquid comprising a fluorinated salt has a refractive index below 1.39, preferably below 1.37, preferably while having a freezing point below −20° C.

According to an alternative embodiment, the conductive liquid has a refractive index higher than the non-conductive liquid. In this embodiment, one advantage of using a fluorinated salt in the conductive liquid is that the density difference between the two liquids can be minimized, especially when the non-conductive liquid comprises compounds having high density, typically above 1.2 g/cm³, such as for example fluorinated oils. Fluorinated oils are low refractive index compounds, allowing to provide a high difference in refractive index between the two liquids.

Preferably, the difference between the refractive index of the conductive liquid and the refractive index of the non-conductive liquid the is greater than 0.24, preferably over a broad temperature range, preferably from −30° C. to 85° C.

According to another preferred embodiment, the conductive liquid comprises at least one freezing-point lowering agent. Preferred freezing-point lowering agents comprise alcohol, glycol, glycol ether, polyol, polyetherpolyol and the like, or mixtures thereof. Examples thereof include ethylene glycol, 1,3-propanediol or 1,2-propanediol.

According to a preferred embodiment, the conductive liquid preferably comprises less than 30% by weight of freezing-point lowering agent, preferably less than 20%, preferably less than 5% by weight, based on the total weight of the conductive liquid. When a freezing-point lowering agent is present, the conductive liquid preferably comprises more than 1%, preferably more than 5%, preferably more than 10% by weight, based on the total weight of the conductive liquid. Preferably, the conductive liquid comprises glycol, preferably ethylene glycol or 1,3-propanediol (also known as Trimethylene glycol or TMG).

One of the advantages of using glycols in combination with salts as freezing-point lowering agents is to avoid an excessive increase of the conductive liquid density. Preferably, the conductive liquid density is below 1.2 g/cm³ at 20° C. For a given freezing point, a solution of salt and water has comparably a higher density than a solution of glycols and water. Glycols having compounds such as R—(OH)2, R being an alkyl group, preferably a C2-C4 alkyl, are preferably used. Such glycols show a low miscibility with components of the non-conductive liquid, and thus they do not compromise the electrowetting device reliability.

Another advantage of using glycols in the conductive liquid is that they act as viscosity-controlling agents. The viscosity is related to the response time of the electrowetting optical device, and controlling viscosity, in particular lowering viscosity provides rapid electrowetting optical devices with short response time.

The use of anti-freezing agents such as salts and/or glycols, preferably the glycols previously described, allows the conductive liquid to remain liquid within a temperature range from −30° C. to +85° C., preferably from −20° C. to +65° C., more preferably from −10° C. to +65° C.

According to another preferred embodiment, the conductive liquid contains less than 5% of an additive such as for example pentanol, or polypropylene glycol, preferably having an average weight (Mw) from 200 g/mol to 2000 g/mol, more preferably from 200 g/mol to 1000 g/mol, still more preferably from 350 g/mol to 600 g/mol, still more preferably from 350 g/mol to 500 g/mol, preferably from 375 g/mol to 500 g/mol, for example of 425 g/mol, or a mixture thereof. One advantage of using such additives is that they act as surfactants allowing to provide steady interface tension between the two liquids over a broad range of temperature.

In a further preferred embodiment, the non-conductive liquid comprises at least one compound having a refractive index higher than 1.55, preferably higher than 1.60, more preferably greater than 1.63, and even more preferably greater than 1.66.

In a preferred embodiment, the non-conductive liquid may comprise diphenydimethylsilane, 2-(ethylthio)benzothiazole, 1-chloronaphtalene, Santolight™ SL-5267, commercially available from SantoVac Fluids (now SantoLubes LLC, Missouri, US) or a chemically similar liquid, thianaphtene, 4-bromodiphenyl ether, 1-phenylnaphtalene, 2.5-dibromotoluene, phenyl sulphide, and the like, or mixtures thereof.

The composition of the non-conductive liquid is preferably chosen such that its viscosity, its refractive index, its density and its miscibility with the conductive liquid are suited for providing a performing electrowetting device within a broad temperature range. Numerous non-conductive components may fulfill the requirements in terms of refractive index, for example compounds having preferably a refractive index higher than 1.55. However the compounds used in the non-conductive liquid are also preferably chosen according to other parameters allowing providing a performing electrowetting optical device. These parameters are for example:

miscibility with water: the non-conductive liquid should preferably have a low miscibility with water in the preferred temperature range.

chemical stability: compounds used in the non-conducting liquid should be preferably chemically stable, i.e. they should not exhibit chemical reactivity in presence of other compounds of the conducting and non-conducting liquids or within the functional temperature range.

density: a high density to be able to match the density of the conductive liquid, in the sense that the difference in density of the two liquids should be preferably limited, preferably lower than 0.1 g/cm³, more preferably lower than 0.01 g/cm³, even more preferably lower than $3.10^{-3}$ g/cm³, the density being measured at 20° C.

viscosity: a viscosity as low as possible, preferably lower than 40 cs, preferably lower than 20 cs and even preferably lower than 10 cs in a temperature range comprised between −20 and +70° C., to allow obtaining a low response time electrowetting device;

The list of cited parameters, together with the refractive index parameter, is not limitative and other parameters can be taken into account for the choice of compounds of the non-conductive liquid.

According to a preferred embodiment, the non-conductive liquid may comprise from 30% by weight, preferably from 30% to 80% by weight, based on the total weight of the non-conductive liquid, of a compound of formula 1a or 1b, or a mixture of compounds thereof:

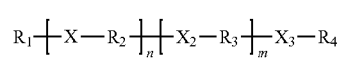

1a

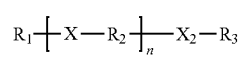

1b wherein each of R1 and R4 is a non substituted aromatic ring; R2 and R3 are each chosen from alkyl, cycloalkyl, (hetero)aryl, (hetero)arylalkyl; n and m are independently each 1-5, preferably 1-2; and X, X2 and X3 are each independently chosen from oxygen (O) or sulfur (S) atoms.

In the above formulae:
- alkyl means a straight or branched alkyl radical having from about 1 to about 10 carbon atoms, preferably from about 1 to about 6 carbon atoms; preferred alkyl includes methyl, ethyl, n propyl, isopropyl;
- (hetero)aryl means an aromatic or heteroaromatic radical containing from about 5 to about 12 atoms, forming at least one, preferably one, aromatic and/or heteroaromatic ring, said ring(s) being optionally substituted by one or more halogens, preferably 1, 2, 3 halogen atoms (mainly fluorine, chlorine and/or bromine)
- (hetero)arylalkyl is as defined above for each of the alkyl and (hetero)aryl radical; preferred (hetero)arylalkyls include benzyl, phenethyl, optionally substituted with 1, 2 or 3 halogen atoms;

According to a preferred embodiment, the compound of formula 1a or 1b is a phenyl ether oligomer, a phenyl thioether oligomer and the like, for example thiobis[phenoxybenzene], bis(phenylmercapto)benzene, or similar 3,4 ring phenylether/thioether oligomers. The upper preferred limit is preferably related to viscosity: it allows not increasing too much the viscosity of the non-conductive liquid and to provide a low response time electrowetting device.

According to a preferred embodiment, the non-conductive liquid comprises more than 30% of a compound of formula 1a or 1b, or a mixture of compounds thereof, more preferably more than 35%, and still more preferably more than 50%, each percentage being a percentage by weight, based on the total weight of the non-conductive liquid. In a further preferred embodiment the phenyl ether oligomer and/or phenyl thioether oligomer based compound is SantoLight™ SL-5267 from SantoVac Fluids, now SantoLubes LLC, St. Charles, Mo., US—or a chemically identical fluid A further advantage of such an embodiment is that the non-conductive liquid is more chemically stable with the conductive liquid. Such compounds used in the non-conductive liquid have low reactivity with water, including at elevated temperature, for example above 50° C.

According to one preferred embodiment, the non-conductive liquid and the conductive liquid have substantially the same density. This means that the difference of densities may vary within a narrow range. Preferably, the liquids have limited difference in density over a broad temperature range, preferably from −30° C. to 85° C., more preferably from −20° C. to 65° C. Preferably, the difference in the density of the liquids is lower than 0.1 g/cm$^3$, more preferably lower than 0.01 g/cm$^3$, even more preferably lower than $3.10^{-3}$ g/cm$^3$.

According to preferred embodiment, compounds having a high density, for example density from 1.2 g/cm$^3$ at 20° C., are preferably used in the non-conductive liquid. This allows a density matching with the density of the conductive liquid, especially when high amounts of salts, generally increasing the density of a solution, are solubilized in the conductive liquid.

In one preferred embodiment, the non-conductive liquid has a refractive index greater than 1.60, more preferably greater than 1.64, and even more preferably more than 1.66.

In one preferred embodiment, the difference in refractive index between the conductive and the non-conductive liquid is greater than 0.24, preferably greater than 0.27, and more preferably greater than 0.29.

Such a difference in refractive index between the two liquids is particularly well suited to optical applications such as zoom, variable focus devices, variable illumination devices wherein the illumination depends on the difference of refractive index between two liquids, or optical devices where a tilt of the optical axis can be performed, for example used for light beam deflection or image stabilization applications. Such electrowetting optical devices allowing tilting of the optical axis are for example described in patent application EP-A1-2009468 in the name of the Applicant. In such electrowetting optical devices, different voltages can be applied at the liquid-liquid interface resulting in a geometrical tilt of the interface and thus of the optical axis of the optical device. The optical tilt is a function of the geometrical tilt and the refractive index difference between the two liquids. The greater the refractive index difference is, the greater the optical tilt is.

According to a preferred embodiment, viscosity-controlling agents, especially viscosity lowering agents are used in the non-conductive liquid to lower the response time of the electrowetting optical device. Such compounds are preferably used to lower the viscosity of the non-conductive liquid, in particular when other compounds, such as phenyl thioether oligomers contained in the non-conductive liquid tend to increase its viscosity. Such viscosity-controlling agents, such as for example diphenyl sulfide, dibromotoluene, diphenyldimethylsilane, or thianaphtene, have preferably a high refractive index, preferably such that the non-conductive liquid keeps a high refractive index while having its viscosity lowered.

According to a preferred embodiment, the non-conductive liquid remains liquid within a temperature range from −10° C. to +65° C., preferably from −20° C. to +65° C., more preferably from −30° C. to +85° C.

According to another preferred embodiment, the non-conductive liquid comprises an anti-oxidant compound, such as for example the BHT-type (butylated hydroxytoluene) anti-oxidants, preferably 2,6-di-tert-butyl-4-methylphenol.

The electrowetting optical device may be used as or be part of a variable focal length liquid lens, an optical zoom, an ophthalmic device, a device having a variable tilt of the optical axis, an image stabilization device, a light beam deflection device, a variable illumination device and any other optical device using electrowetting.

According to a further aspect thereof, the disclosure concerns an apparatus comprising an electrowetting optical device. According to a preferred embodiment, the apparatus comprises means for applying an A.C. voltage to the electrowetting optical device. Preferably, the apparatus further comprises a driver or similar electronic means for controlling the lens. In a preferred embodiment, the lens and the driver or similar electronic means are integrated in the apparatus. In another preferred embodiment, the apparatus comprises a plurality (more than one) of lenses and preferably at least one driver or similar electronic means Preferably, said apparatus is a camera, a cell phone, an endoscope, a telemeter, a dental video, a barcode reader, a beam deflector, a microscope.

Additional preferred embodiments relate to an electrowetting optical device which may further comprise one or several of the following features:
- a drop of non-conductive liquid is arranged on an insulating substrate, for example in the form of a plate, and a drop of conductive liquid is arranged above to cover the drop of non-conductive liquid and the substrate;
- the conductive liquid and the non-conductive liquid have substantially the same density and different optical indexes;
- the device comprises means for applying or allowing to apply an alternative tension on the conductive liquid;
- the insulating substrate has a recess to center the non-conductive liquid; the recess is preferably of circular section;

the insulating substrate comprises or is made of a transparent material;

the insulating substrate is made of, or is coated with, a material that is hydrophobic;

the insulating substrate is made of, or is coated with, a material that is homogeneously wettable by the non-conductive liquid;

the insulating substrate is made of, or is coated with, a material having undergone a surface treatment such that the material is non homogeneously wettable by the non-conductive liquid.

the device comprises electrodes, typically an electrode and a counter-electrode, in order to apply the tension on the conductive liquid;

The present disclosure will now be described in further details by way of non-limiting examples and by reference to the attached drawings.

DETAILED DESCRIPTION

Figure 1:
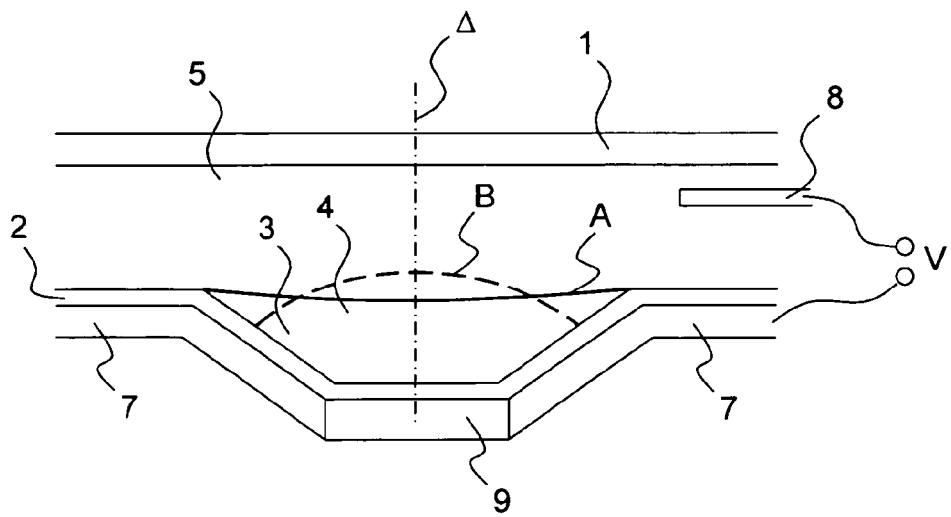
FIG. 1 shows a simplified cross-section view of a variable focal length liquid lens according to an electrowetting optical device according to a preferred embodiment.

FIG. 1 shows a simplified cross-section view of an example of a variable focal length liquid lens according to a preferred embodiment. A cell is defined by an insulating plate 1, side walls (not shown) and a dielectric transparent enclosure 2. The cell is filled with a conductive liquid 5. The dielectric enclosure 2 has a low wettability with respect to conductive liquid 5. In the embodiment shown, a lower wall or plate of the dielectric enclosure 2 includes a hollow 3, centered around an axis Δ perpendicular to this plate. In FIG. 1, hollow 3 is a truncated cone. A drop of non-conductive liquid 4 is placed in hollow 3. Liquid drop 4 naturally takes a position A centered on axis Δ. Non-conductive liquid 4 and conductive liquid 5 are both transparent, non-miscible, they have different optical indexes and have substantially the same density. The dioptre formed between liquids 4 and 5 forms a surface of a liquid lens, the optical axis of which is axis Δ and the other surface of which corresponds to the contact between the drop and the bottom of the hollow. An electrode 7 is placed on the external surface of dielectric enclosure 2. Reference numeral 9 indicates a glass or plastic wall. An electrode 8 is in contact with conductive liquid 5. A voltage source (not shown) enables applying an A.C. voltage V between electrodes 7 and 8.

Voltage V may be increased from 0 volt to a maximum voltage, which depends on the used materials. When the voltage increases, non-conductive liquid drop 4 deforms to reach a limiting position (designated as B). While drop 4 deforms from its position A (rest position, without tension, concave interface with conductive liquid 5) to its position B (convex interface with conductive liquid 5), the focus of the liquid lens varies.

Refractive index of an aqueous solution is given by the relation below:

$$n = 1.334 + XCn \quad (1)$$

with (X) being the salt concentration in weight fraction and (Cn) being the refractive index coefficient of the salt.

Similarly, density of an aqueous solution is given by the following relation:

$$d = 1 + XCd \quad (2)$$

with (X) being the salt concentration in weight fraction and (Cd) being a density coefficient. Example of ionic salts and their refractive and density coefficients (Cn) and (Cd) respectively are given in Table 1 below. Values of Table 1 have been measured experimentally.

TABLE 1

| Compound | Cd (Compound density) | Cn (Compound refractive index) |
|---|---|---|
| NaBr | 0.80 | 0.13 |
| LiCl | 0.55 | 0.21 |
| $CH_3COOK$ Potassium acetate | 0.48 | 0.12 |
| LiBr | 0.82 | 0.16 |
| $Na_2SO_4$ | 1.90 | 0.28 |
| $ZnBr_2$ | 1.90 | 0.28 |
| $CF_3SO_3Na$ Sodium Triflate | 0.82 | 0.03 |
| $CF_3COONa$ Sodium trifluoroacetate | 0.71 | 0.04 |

Figure 2:
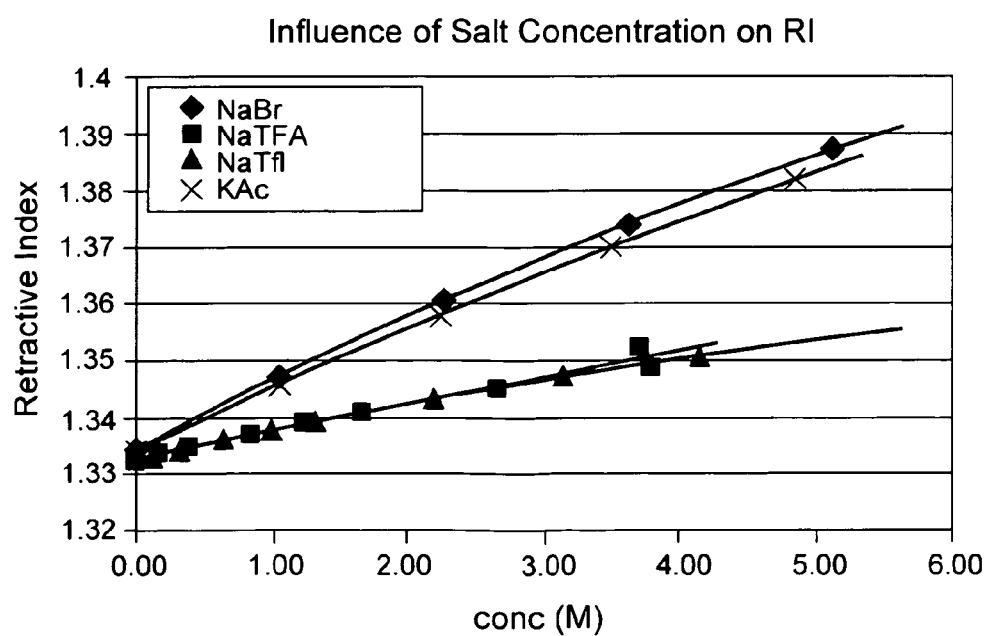
FIG. 2 is a graph showing the influence of salt concentration in Mole/L on the refractive index (RI) of an aqueous solution for different salts used in electrowetting optical devices of the prior art and according to preferred embodiments.
Figure 3:
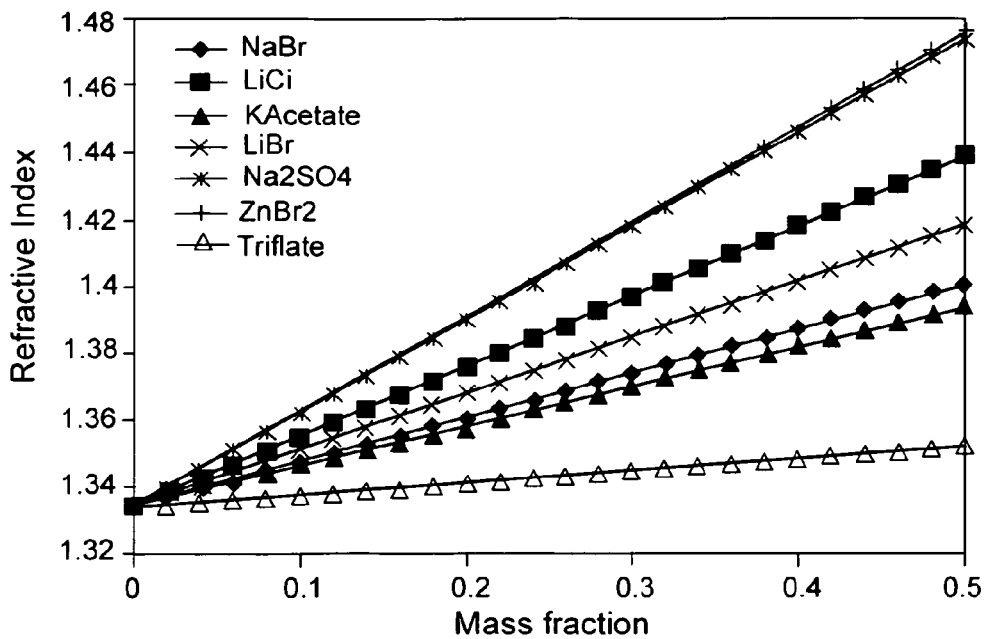
FIG. 3 is a graph showing the evolution of refractive index versus mass fraction of various salts in water.

FIGS. 2 and 3 are graphs showing the refractive index of conductive liquids comprising aqueous solutions each containing a different ionic salt as a function of the concentration or mass fraction. FIG. 2 is based on measurements performed for four conductive liquids containing respectively different amounts (in Moles) of sodium bromide, potassium acetate, sodium trifluoroacetate and sodium triflate, whereas FIG. 3 shows the evolution of the refractive index of several conductive liquids containing various salts concentration in weight fraction, based on calculation according to equation (1) and Table 1 experimental data. According to a preferred embodiment, fluorinated salts like sodium trifluoroacetate (NaTFA in FIG. 2), of formula $CF_3COONa$, and sodium triflate also called sodium trifluoromethanesulfonate (NaTfl in FIG. 2), of formula $CF_3SO_3Na$, are preferably used as freezing-point lowering agents in the conductive liquid. As illustrated in FIGS. 2 and 3, conductive liquids comprising such fluorinated salts have a much lower refractive index than conductive liquids obtained with other salts at similar concentrations, for example salts like sodium bromine or potassium acetate used in prior art conductive liquids.

Figure 4:
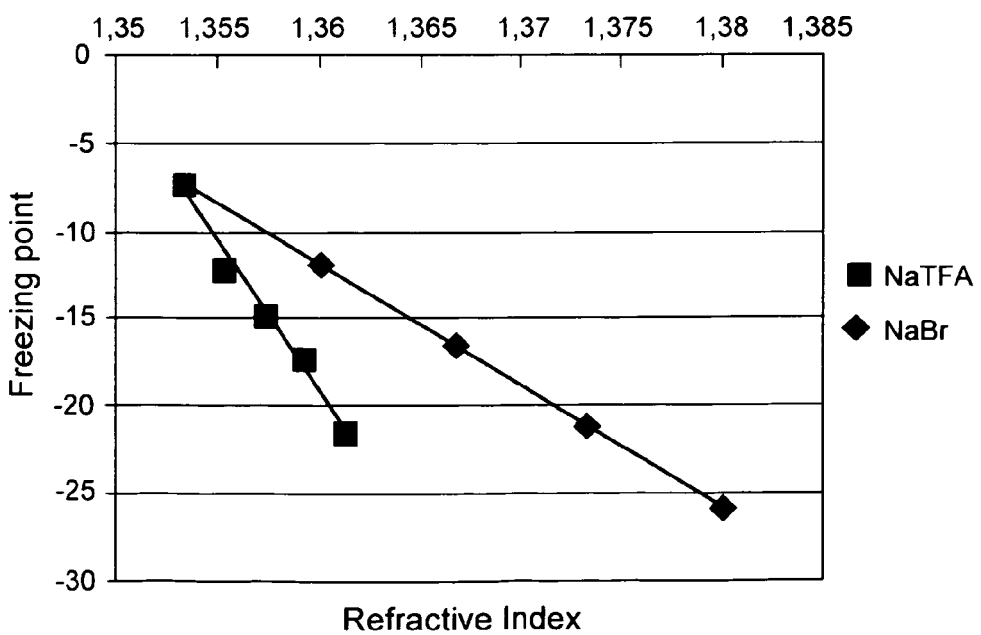
FIG. 4 is a graph comparing the freezing point versus the refractive index of a prior art conductive liquid and a conductive liquid according to one preferred embodiment.

FIG. 4 illustrates the effect of a fluorinated salt such as sodium trifluoroacetate instead of a salt used in prior art, like sodium bromide, on the freezing point and the refractive index of a conductive liquid comprising a solution of water and salt. FIG. 4 is based on measurements performed on conductive liquids comprising various amounts (not shown), including concentrations from 5% to about 65% by weight, of respectively sodium trifluoroacetate and sodium bromide salt. FIG. 4 shows that the refractive index of the conductive liquid increases while freezing point decreases when increasing the salt concentration. At a given freezing point, for example −20° C., a conductive liquid made of an aqueous solution comprising sodium trifluoroacetate has a much lower refractive index than a conductive liquid made of an aqueous solution comprising a non fluorinated salt like sodium bromide. At −20° C. for example, which corresponds to a temperature where optical devices are generally required to be operational, although the refractive index difference between the two conductive liquids shown in FIG. 4 is about 0.15, still this represents a significant difference in the context of optical applications such as zoom or variable focus devices. The refractive index difference between the two conductive liquids shown in FIG. 4 increases when the freezing point decreases, showing that the effect of moderate increase in refractive index when using fluorinated salts instead of other ionic salts advantageously permits to maintain the desired difference of refractive index between the conductive liquid and the non-conductive liquid in a broader range of storage and operation temperatures when compared to the prior art.

The electrowetting optical device enables to get not only a large difference in refractive indices between the conductive and the non-conductive liquids, but also a low mutual miscibility of these liquids over a wide range of temperature.

Figure 5:
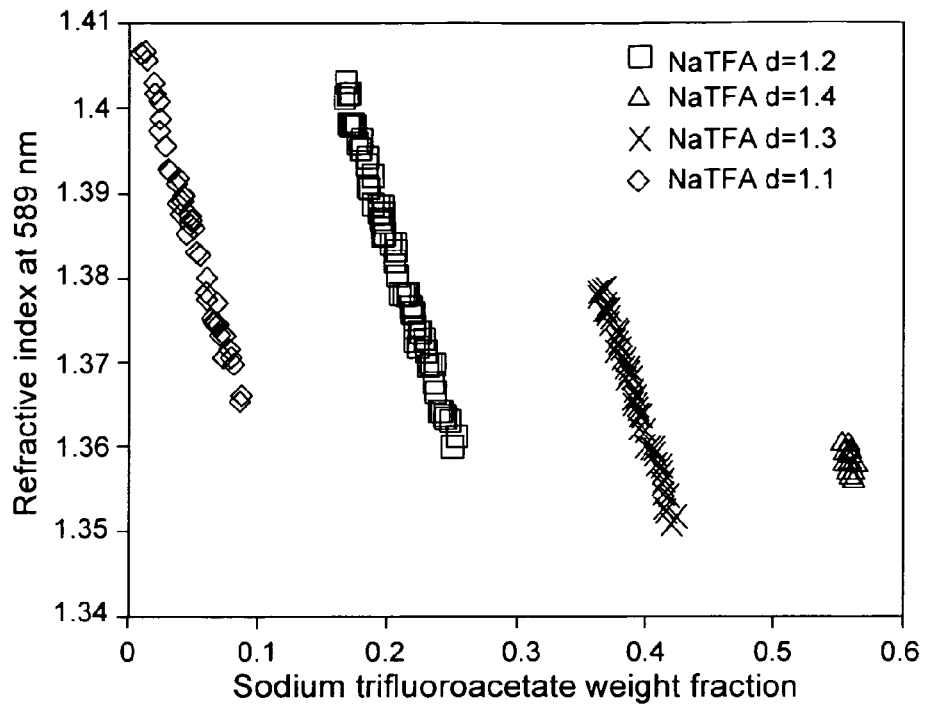
FIG. 5 is a graph showing the refractive index of a conductive liquid as a function of sodium trifluoroacetate weight fraction for various density of the liquid.

FIG. 5 illustrates the refractive index of a conductive liquid as a function of sodium trifluoroacetate weight fraction for various conductive liquid densities. The weight fraction of glycols used allows obtaining a conductive liquid having a freezing point below −20°. As indicated on FIG. 5, a limited range of weight fraction of sodium trifluoroacetate is preferred if we take into account the density, refractive index, and freezing point.

Conductive liquids comprising from 5% by weight of sodium trifluoroacetate based on the total weight of conductive liquid have been prepared. Advantageously, conductive liquids comprising from 5% to 60% by weight of sodium trifluoroacetate had a density comprised from d=1.1 to d=1.4 g/cm$^3$, a freezing point below −20° C., and a refractive index below n=1.39 at 589 nm. For concentration of a fluorinated salt inferior to 5%, the refractive index of the conductive liquid is above 1.39. Conductive liquids comprising from 8% by weight of sodium trifluoroacetate had a density from d=1.1 g/cm$^3$, a freezing point below −20° C., and a refractive index below n=1.37 at 589 nm.

The electrowetting optical device enables to limit the Abbe number variation of the conductive liquid related to the addition of salts. The inventors have surprisingly found that fluorinated salts in the conductive liquid allow limiting the variation of the Abbe number compared to other salts. Abbe number is defined as $V=(nD-1)/(nF-nC)$ with nD, nF and nC referring to the Fraunhofer D, F and C lines (589.2 nm, 486.1 nm and 656.3 nm respectively). Hence a low dispersion solution is characterized by a high Abbe number.

As observed in Table 2, a solution of 60% by weight of LiBr or ZnBr2 substantially increases the refractive index (the difference between nD of a solution comprising water and 60% by weight of LiBr or ZnBr2 and nD of water is respectively equal to +0.14 and +0.17) and decreases the Abbe number, inducing high chromatic aberrations. On the opposite, a liquid composition comprising water and 60% by weight of fluorinated salt like sodium trifluoroacetate (NaTFA) advantageously increases Abbe number compared to pure water. The density of such a solution is expected to be around d=1.4 g/cm$^3$.

Fluorinated salts can therefore be used to obtain a suitable density of the conductive liquid without increasing refractive index and without inducing chromatic aberrations.

TABLE 2

|  | LiBr | ZnBr2 | NaTFA | Water |
|---|---|---|---|---|
| % weight | 60% | 60% | 60% | — |
| nD 589, 2 nm | 1.47 | 1.50 | 1.35 | 1.33 |
| Abbe number | 36.3 | 38.7 | 58.7 | 56.8 |
| nD$_{(solution)}$ − nD$_{(water)}$ | +0.14 | +0.17 | +0.02 | — |

In the present application, refractive index and Abbe number are measured experimentally using a multiple wavelength refractometer DSR from SCHMIDT+HAENSCH. The measurement is based on CCD-sensor detection of the critical angle of total reflection. This is done sequentially for all wavelengths (colours) and displayed as refractive indices according to these wavelengths. Temperature of the liquid is controlled with a build-in Peltier module leading to a temperature accuracy of ±0.1° C. and a refractive index accuracy of ±0.00005.

Additional preferred examples of conductive liquids and non-conductive liquids suitable for preferred embodiments of the electrowetting optical device are given below.

Preferred Conductive Liquid and Non-Conductive Liquids:

Preferred salts used in preferred conductive liquid have a refractive coefficient Cn below 0.1, preferably below 0.08, more preferable below 0.04.

Preferably, the non-conductive liquid has a refractive index greater than the refractive index of the conductive liquid, and preferably comprises at least one compound having a refractive index higher than 1.55. Examples of such compounds are given Table 3.

TABLE 3

|  | refractive index at 589 nm | Viscosity at 20° C. (cS) | density at 20° C. (g/cm3) |
|---|---|---|---|
| 1,2-Dichlorobenzene | 1.55 | 53.5 | 1.07 |
| 2-phenylethylbromide | 1.56 | 2.3 | 1.37 |
| Bromobenzene | 1.56 | 0.8 | 1.50 |
| diphenyldimethylsilane | 1.56 | 4.5 | 0.99 |
| 1-Phenyl-1-cyclohexene | 1.57 | 4.7 | 1.00 |
| Cyclopropyl phenyl sulfide | 1.58 | 2.7 | 1.06 |
| 2-Fluorobenzophenone | 1.59 | 17.8 | 1.19 |
| Thioanisole | 1.59 | 1.5 | 1.06 |
| 4-Chlorodiphenyl ether | 1.59 | 4.7 | 1.19 |
| 1,1,2-Tribromoethane | 1.59 | 1.6 | 2.61 |
| 2.5-Dibromotoluene | 1.60 | 1.9 | 1.85 |
| 4-Bromodiphenyl ether | 1.61 | 5.9 | 1.42 |
| Santovac ® FCS-61 | 1.61 | 41.4 | 1.14 |
| 2-Bromobiphenyl | 1.63 | 9.9 | 1.40 |
| Diphenyl sulfide | 1.63 | 4.3 | 1.11 |
| 1-Chloronaphtalene | 1.63 | 2.8 | 1.19 |
| 2-Bromothioanisole | 1.63 | 3.3 | 1.54 |
| Santovac ® 5 | 1.63 | 1000 | 1.20 |
| 1-Bromonaphtalene | 1.66 | 3.7 | 1.49 |
| 2-(Ethylthio)benzothiazole | 1.66 | 10.0 | 1.23 |
| 1-phenylnaphtalene | 1.67 | 77.5 | 1.10 |
| SL-5267 | 1.67 | 73.3 | 1.20 |
| Santovac ® MCS-293 | 1.67 | 72.8 | 1.20 |

Refractive index of a mixture of compounds used in the non-conductive liquid is given by the relation $n=\Sigma_{i=1}^{m} X_i n_i$, where $X_i$ and $n_i$ are the weight fraction and refractive index of each compound.

Examples of compositions with concentration ranges for each of the compound used in the non-conductive liquid are given in Table 4. Clusters 1 to 5 are examples of non-conductive liquids that allow to maintain the viscosity of the liquid substantially constant, while increasing its refractive index, keeping the miscibility with the conductive liquid low, and matching the density with the density of the conductive liquid.

TABLE 4

| Compound | Cluster 1 (%) | Cluster 2 (%) | Cluster 3 (%) | Cluster 4 (%) | Cluster 5 (%) |
|---|---|---|---|---|---|
| 1-Chloronaphtalene | 35 < X < 45 | 25 < X < 35 | <5 | <5 | <5 |
| Santolight ™ SL-5267 | 55 < X < 65 | 35 < X < 45 | 15 < X < 25 | 25 < X < 35 | 35 < X < 45 |
| 1-phenylnaphtalene | <5 | <5 | 35 < X < 45 | 25 < X < 35 | 50 < X < 60 |
| Ethylthiobenzothiazole | <5 | 35 < X < 45 | <5 | <5 | <5 |
| 2.5-dibromotoluene | <5 | <5 | 5 < X < 15 | 5 < X < 15 | 35 < X < 45 |
| Diphenylsulfide | <5 | <5 | 10 < X < 20 | 10 < X < 20 | 25 < X < 35 |
| 4-Bromodiphenylether | <5 | <5 | <5 | <5 | <5 |
| Thionaphtene | <5 | <5 | <5 | <5 | <5 |
| Dimethyldiphenylsilane | <5 | <5 | <5 | <5 | <5 |

In the present application, partial miscibility between two liquids is measured using a refractometer. Refracting indices from both liquids are measured before and after being put into contact for several days. When mixed, a liquid undergoes a refractive index variation according to the relative concentration of one liquid into the other:

$$N'1 = N1X1 + N2(1-X1)$$

$$N'2 = N2X2 + N1(1-X2)$$

Where X1 and X2 are the proportions of a first and a second liquids respectively, N1 and N2 the initial refractive indices of liquids 1 and 2, and N'1 and N'2 the refractive indices of liquids 1 and 2 after storage. From this measurement, it is thus possible to evaluate the partial miscibility from the liquids. Examples of results from measurements performed on compositions D and E further described are given Table 5, indicating a partial miscibility of 0.009% and 0.012% in weight. Storage conditions are storage during 24 hours at room temperature.

TABLE 5

| Composition | Non-conductive liquid Refractive index | Conductive liquid Refractive index Before storage | Conductive liquid Refractive index After storage | Partial miscibility |
|---|---|---|---|---|
| D | 1.66052 | 1.36004 | 1.36008 | 0.012% |
| E | 1.65342 | 1.35915 | 1.35918 | 0.009% |

In the present description and in the following claims, the density and cinematic viscosity are measured following ASTM D7042-04. The resistance of the liquid between a rotor and a stator is determined at the determined temperature, e.g. at −10° C., −20° C., +60° C. or +70° C. and/or at intermediate values within the range of temperature comprised between −10° C., −20° C. and +60° C. or +70° C. A viscometer of the type of Anton Paar SVM 3000 may be used, and reference is made to EP-B1-0 926 481. The content of these documents is hereby incorporated herein by reference.

In the present description and in the following claims, for either one or both the conductive and non-conductive liquids, as well as for the electrowetting optical device, transparency is to be understood as a transmission of more than about 96% over a wavelength range of from about 400 nm to about 700 nm and/or a scattering energy of less than about 2% in an about 60° (degrees) cone around the direct incidence in the same wavelength range.

Compositions B to G and I to J given below are compositions of non-conductive and conductive liquids used in electrowetting optical devices according to preferred embodiments. Compositions A and H are given comparative examples. All % are by weight. All characteristics are measured at 20° C.

| COMPOSITION A (COMPARATIVE) | | | |
|---|---|---|---|
| NON CONDUCTIVE LIQUID | | CONDUCTIVE LIQUID | |
| % in weight | compound | % in weight | compound |
| 6.00% | 1-phenylnaphtalene | 20.00% | NaBr |
| 11.00% | 4-bromodiphenylether | 60.00% | WATER |
| 31.00% | phenylsulfide | 20.00% | EG |
| 51.00% | SL5267 | | |
| 1.00% | diphenydimethylsilane | | |

| COMPOSITION B | | | |
|---|---|---|---|
| NON CONDUCTIVE LIQUID | | CONDUCTIVE LIQUID | |
| % in weight | compound | % in weight | compound |
| 6.00% | 1-phenylnaphtalene | 19.60% | Sodium triflate |
| 11.00% | 4-bromodiphenylether | 60.40% | WATER |
| 31.00% | phenylsulfide | 20.00% | EG |
| 51.00% | SL5267 | | |
| 1.00% | diphenydimethylsilane | | |

| COMPOSITION C | | | |
|---|---|---|---|
| NON CONDUCTIVE LIQUID | | CONDUCTIVE LIQUID | |
| % in weight | compound | % in weight | compound |
| 6.00% | 1-phenylnaphtalene | 24.00% | NaTFA |
| 11.00% | 4-bromodiphenylether | 57.00% | WATER |
| 31.00% | phenylsulfide | 19.00% | EG |
| 51.00% | SL5267 | | |
| 1.00% | diphenydimethylsilane | | |

| COMPOSITION D | | | |
|---|---|---|---|
| NON CONDUCTIVE LIQUID | | CONDUCTIVE LIQUID | |
| % in weight | compound | % in weight | compound |
| 27.00% | Ethylthiobenzothiazole | 27.80% | Sodium Triflate |
| 44.50% | SL5267 | 57.10% | WATER |
| 27.60% | Thianaphtene | 15.00% | EG |

| COMPOSITION E | | | |
|---|---|---|---|
| NON CONDUCTIVE LIQUID | | CONDUCTIVE LIQUID | |
| % in weight | compound | % in weight | compound |
| 7.20% | Ethylthiobenzothiazole | 29.30% | Sodium Triflate |
| 47.80% | SL5267 | 57.10% | WATER |
| 41.70% | 1-chloronaphtalene | 13.60% | EG |
| 3.30% | 2.5-dibromotoluene | | |

| COMPOSITION F | | | |
|---|---|---|---|
| NON CONDUCTIVE LIQUID | | CONDUCTIVE LIQUID | |
| % in weight | compound | % in weight | compound |
| 14.70% | Ethylthiobenzothiazole | 26.70% | NaTFA |
| 42.50% | SL5267 | 56.30% | WATER |
| 0.80% | 4-bromodiphenylether | 17.00% | EG |
| 42.00% | 1-chloronaphtalene | | |

| COMPOSITION G | | | |
|---|---|---|---|
| NON CONDUCTIVE LIQUID | | CONDUCTIVE LIQUID | |
| % in weight | compound | % in weight | compound |
| 54.5% | SL5267 | 10.0% | NaTFA |
| 5.0% | diphenyldimethylgermane | 60.0% | WATER |
| 40.5% | diphenyldimethylsilane | 30.0% | EG |

| COMPOSITION H (COMPARATIVE) | | | |
|---|---|---|---|
| NON CONDUCTIVE LIQUID | | CONDUCTIVE LIQUID | |
| % in weight | compound | % in weight | compound |
| 56.00% | SL-5267 | 2.00% | NaTFA |
| 28.00% | diphenyldimethylsilane | 68.00% | EG |
| 16.00% | 1.3-diphenyl-1.1.3.3-tetramethyldisiloxane | 30.00% | WATER |

| COMPOSITION I | | | |
|---|---|---|---|
| NON CONDUCTIVE LIQUID | | CONDUCTIVE LIQUID | |
| % in weight | compound | % in weight | compound |
| 15.00% | SL-5267 | 65.00% | NaTFA |
| 39.00% | 5-bromo-2-chlorotoluene | 35.00% | WATER |
| 5.00% | 2-phenylethylbromid | | |
| 9.00% | 2-Bromobiphenyl | | |
| 32.00% | Bromobenzene | | |

| COMPOSITION J | | | |
|---|---|---|---|
| NON CONDUCTIVE LIQUID | | CONDUCTIVE LIQUID | |
| % in weight | compound | % in weight | compound |
| 2.23% | 1-phenylnaphtalène | 26.30% | NaTFA |
| 5.81% | 2.5-dibromotoluene | 56.40% | WATER |
| 53.49% | SL-5267 | 17.30% | EG |
| 38.47% | Phenyl sulfide | | |

Multi-phase liquid H is a comparative composition with a weight fraction of fluorinated salt below 5%.

Multi-phase H is an example of composition comprising 2% of sodium trifluoroacetate i.e. a low weight fraction of fluorinated salt. The glycol amount allows obtaining a freezing point below −20°, corresponding to a refractive index of n=1.4. The density of the conductive liquid was low, around d=1.1 g/cm$^3$, and the non-conductive liquid has been formulated to obtain a suitable density matched with the conductive liquid, with a maximum viscosity of 21 cS. The maximum refractive index of said non-conductive liquid was obtained at 1.61, corresponding to a refractive index difference of 0.21 for this multi-phase liquid composition. In this example, using a low weight fraction of salt cannot ensure a proper refractive index difference between the two liquids.

Multi-phase composition C having 24% of sodium trifluoroacetate had a refractive index difference of 0.29 with a freezing point below −20° C. This composition is particularly suitable for an electrowetting device having a high refractive index difference between the conductive and non-conductive liquid.

Table 6 below gives the following measured parameters of each example of multi-phase compositions described above: density of the multi-phase composition, refractive index for each of the conductive liquid and the non-conductive liquid, refraction index difference between the two liquids, cinematic viscosity for each of the two liquids, and state of both liquids at −20° C.

All % are by weight. All characteristics are measured at 20° C.

State of the liquids indicated in Table 6 corresponds to data obtained while performing a freezing point test consisting in storing the liquids at −20° C. for at least 1 day and determining visually if the solution is liquid or solid.

TABLE 6

| | Compositions | | | | | | | | | |
|---|---|---|---|---|---|---|---|---|---|---|
| | A | B | C | D | E | F | G | H | I | J |
| Density (g/cm3) | 1.18 | 1.18 | 1.19 | 1.21 | 1.22 | 1.20 | 1.1107 | 1.1 | 1.46 | 1.20 |
| Non Conductive liquid refractive index at 589 nm | 1.65 | 1.65 | 1.65 | 1.66 | 1.65 | 1.66 | 1.62 | 1.61 | 1.59 | 1.65 |

TABLE 6-continued

|  | Compositions | | | | | | | | | |
| --- | --- | --- | --- | --- | --- | --- | --- | --- | --- | --- |
|  | A | B | C | D | E | F | G | H | I | J |
| Conductive liquid refractive index at 589 nm | 1.39 | 1.36 | 1.36 | 1.36 | 1.36 | 1.36 | 1.37 | 1.40 | 1.36 | 1.36 |
| delta n | 0.27 | 0.29 | 0.29 | 0.30 | 0.29 | 0.30 | 0.25 | 0.21 | 0.23 | 0.29 |
| Conductive liquid viscosity (cS) | 1.7 | 1.7 | 1.7 | 1.5 | 1.4 | 1.6 | 2.3 | 6.6 | 1.1 | 3.1 |
| Non-conductive liquid viscosity (cS) | 22.4 | 22.4 | 22.4 | 15.9 | 14 | 12.7 | 20.6 | 21 | 2.68 | 19.8 |
| State at −20° C. | liquid | liquid | liquid | liquid | liquid | liquid | liquid | liquid | liquid | liquid |

Experimental Studies:

An electrowetting based liquid lens according to a preferred embodiment has been made using the conductive and non-conductive liquids described in composition J.

Figure 6:
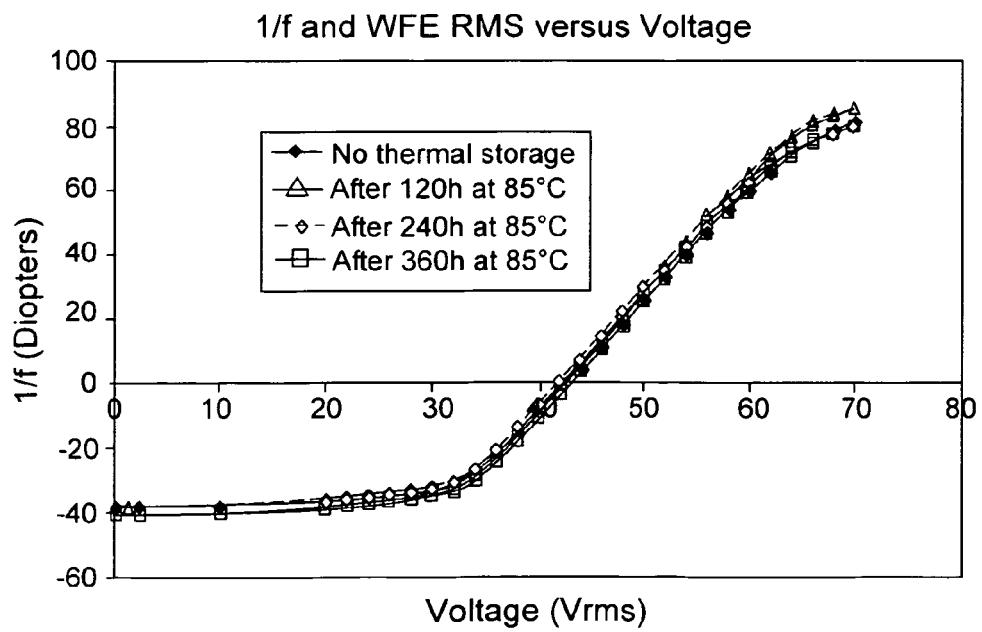
FIG. 6 is a graph showing the optical power versus voltage characteristics of lenses according to a preferred embodiment at different temperature and time period storage conditions.

The focal length has been measured depending on the voltage applied between the first and second electrode, from 0 to 70 V upward and backward of an AC voltage with a sine waveform at 1 kHz. The lens has been stored at 85° C. in a 10% relative humidity for 360 h and the focal length has been measured every 120 h. FIG. 6 shows the focal length versus applied voltage relation before and after 120, 240 and 360 h of the said storage at high temperature.

As observed on FIG. 6, liquid lens exhibits a focal range of 120 m$^{-1}$ allowing a focusing range from infinity down to 8 mm and no noticeable difference in focal length is observed when applying voltage forward and backward, indicating a reversible actuation of the devices according to a preferred embodiment. Such very large focusing range can be desirable in many optical applications. For example in zoom applications, or barcode applications when imaging of small objects at a close distance is required.

These performances remain similar before and after the storage at elevated temperature, indicating a high chemical stability and low partial miscibility of the liquids hereby described.

The invention claimed is:

1. An electrowetting optical device comprising a conductive liquid and a non-conductive liquid, said liquids having a partial miscibility below 0.2% at 20° C., having different refractive indices and forming an interface, wherein the conductive liquid comprises at least 5% by weight of a fluorinated organic salt, based on the total weight of the conductive liquid.

2. The electrowetting optical device of claim 1, wherein the conductive liquid comprises at least 8% by weight of a fluorinated salt, based the total weight of the conductive liquid.

3. The electrowetting optical device of claim 1, wherein the fluorinated salt is sodium trifluoroacetate or sodium triflate.

4. The electrowetting optical device of claim 1, wherein the refractive index of the non-conductive liquid is higher than the refractive index of the conductive liquid.

5. The electrowetting optical device of claim 4, wherein the conductive liquid has a refractive index below 1.39.

6. The electrowetting optical device of claim 1, wherein the difference of refractive index in the visible spectrum between said conductive and non-conductive liquids is greater than 0.24.

7. The electrowetting optical device of claim 1, wherein the conductive liquid further comprises one of a alcohol, glycol, ethylene glycol, glycol ether, polyol, polyetherpolyol or a mixture thereof as lowering freezing-point agents.

8. The electrowetting optical device of claim 1, wherein the non-conductive liquid comprises at least 30% by weight, based on the total weight of the non-conductive liquid, of a compound of formula 1a or 1b, or a mixture of compounds of formula 1a and/or 1b:

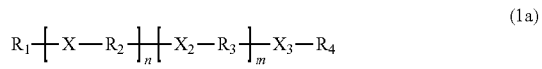

(1a)

(1b)

wherein:
R1 and R4 are each a non substituted aromatic ring;
R2 and R3 are each chosen from alkyl, cycloalkyl, (hetero)aryl, (hetero)arylalkyl;
n and m are each independently 1-5;
X, X2 and X3 are each independently chosen from oxygen (O) or sulfur (S) atoms.

9. The electrowetting optical device of claim 1, wherein the non-conductive liquid comprises one of diphenydimethylsilane, 2-(ethylthio)benzothiazole, 1-chloronaphtalene, Santolight™ SL-5267, thianaphtene, 4-bromodiphenyl ether, 1-phenylnaphtalene, 1-phenylnaphtalene, 2.5-dibromotoluene, phenyl sulphide or mixtures thereof.

10. The electrowetting optical device according to claim 1, which is included in any one of a variable focal length lens, an optical zoom, an ophthalmic lens, a device having a variable tilt of the optical axis, an optical image stabilization device, a light beam deflector device, a variable illumination device.

11. An apparatus comprising an electrowetting optical device according to claim 1.

12. The apparatus according to claim 11, which is any one of a camera, a cell phone, an endoscope, a telemeter, a dental video, a barcode reader, a microscope.

* * * * *